March 3, 1936.                C. L. DELACHAUX                2,032,977
                         HEAT TREATING WELDED STEEL PARTS
                              Filed April 2, 1932
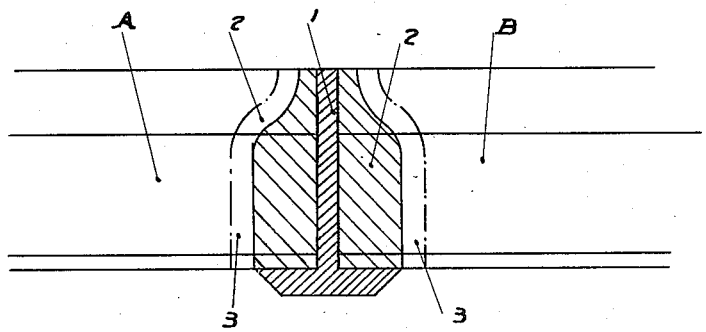
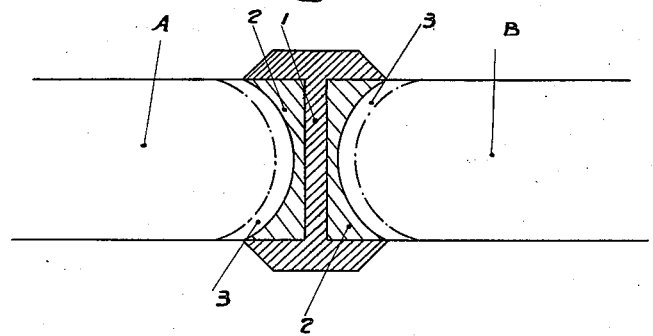

Patented Mar. 3, 1936

2,032,977

UNITED STATES PATENT OFFICE 2,032,977

HEAT TREATING WELDED STEEL PARTS

Clarence Leon Delachaux, Gennevilliers, France, assignor to Acieries De Gennevilliers Anciens Etablissements Delachaux, Gennevilliers, France, a corporation of France Application April 2, 1932, Serial No. 602,783
In France April 2, 1931

3 Claims. (Cl. 148—21.5)

The methods for welding steel parts may be subdivided, generally speaking, into two groups.

In the first group (autogenous or arc welding) the extraneous mass of metal required for welding is generally small and laid in successive layers in a nonhomogeneous manner by reason of the conditions of their application and of the difficulty sometimes experienced in submitting them to a heat treatment.

In the second group a larger homogenous mass of metal is cast between the parts to be welded and round these parts. In this group the welds wherein the additional metal is obtained in a melted state at a temperature of at least about 1500° C. are especially noteworthy. This is the case of welds wherein the steel is obtained aluminothermically or through any other process, for instance in a high or low frequency furnace, such steel being capable of receiving subsequently a thermic treatment.

In these processes the additional metal is cast around and/or between the parts to be welded, the welding being performed either with an intermediary plate between said parts and a clamping apparatus or end to end without an intermediary plate but with a clamping apparatus or according to the so-called "intermediate system" or with an insert without a clamping apparatus and so on.

In the accompanying drawing, Fig. 1 which is a front view and Fig. 2 which is a plan view illustrate diagrammatically the welding of two parts A and B; immediately adjacent the extraneous metal 1 melted at a temperature at least equal to 1500° C. there is a zone 2 where the extraneous metal and the metal of the parts to be welded are melted and alloyed together, the melting and alloying being performed for instance at a temperature at least of about 1400° C. and beyond this zone, a zone 3 which has been altered by the superheating for instance at a temperature above about 1000° C., said zone showing a coarse grain but without any melting.

The figures relate to the case of the so-called intercalary welding method.

In the case of the "plate and clamping device" method for welding the upper part of the space left between the parts to be welded is constituted by a steel plate or wedge which is not normally melted but only altered by superheating. In the case of an end to end welding without any plate there is no space left between the parts to be welded and the welding metal merely covers the outside of these parts. In all cases the metal which has been melted having comparatively weak mechanical characteristics, it is apparent there is no continuity in the metal as the zone of welding corresponds to an insufficient resistance from all standpoints.

This phenomenon is especially important in the welding of hard steel the structure of which is particularly modified through the elevation of temperature due to the welding; the alteration is then all the more considerable as the type of rails considered lowers the temperature for which the metal is hot-shorted or burnt; the debased metal is in fact sometimes liable to break.

The present invention consists in a welding method which allows in spite of the lack of homogeneity of the three above described zones formed by metals the composition and the temperature of deposit of which are different, a welding zone to be obtained the characteristics of which are as near as possible those of the parts to be welded themselves, latter parts being of any type of steel, heat-treated or non heat-treated, cast or laminated and of any composition.

The method according to the present invention consists chiefly in using as a welding mass a steel prepared for instance through an aluminothermic process and which may contain beyond the usual components of a carbon steel (up to about 0,8% of carbon) one or more of the following metals.

Nickel up to about 5%
Chromium up to about 2,5%
Tungsten up to about 1,5%
Molybdenum up to about 1%
Copper up to about 3% after which the welding zone is submitted in situ to a heat treatment such that the properties of both the melted and superheated parts of this welding zone are very near those of the parts before welding as well from a mechanical standpoint (hardness, possibility of cold hammering, resistance against shocks, flexion and strains) as from a cristallographic standpoint.

This heat treatment has also as a consequence the possibility of welding hard rails at high temperatures and of destroying the internal stresses caused by the welding through the successive contractions and expansions of the metal.

The welding may moreover be preceded by a preliminary heating of the ends to be welded together at a temperature between about 650 and 1200° C. with a view to make the superheating and the lamination or forging stresses disappear and to make the grain finer.

The heat treatment may be effected with a crude oil or heavy oil burner or with a gasoline burner or through an electric resistance or in any other manner allowing a suitably controlled rise in temperature.

Such a heat treatment may affect the whole or only part of the joint or of the weld (for instance the rolling surface alone in the case of rails).

The heat treatment may be controlled differently according to the kind of parts to be welded and of welding mass used: it is effected according to the principle of my invention on the welding zone when the latter is cold or at least when its temperature has fallen to a temperature below the lowest of the transformation points of the metals constituting it.

Obviously the application of any heat treatment to the welding zone would produce different results as this heat treatment affects both a superheated metal (zone 3) and molten metals (zones 1 and 2).

These latter zones though formed by metal in a nascent state that is obtained at high temperature, require generally a higher temperature of heating for transforming the grain than a metal of same composition merely superheated.

A first manner of obtaining a homogeneous zone the properties of which are very near those of the parts to be welded consists in choosing in the above defined range of the welding masses, a composition such that the same heat treatment applied together to the molten zones 1 and 2 and to the superheated zone 3 having a different predetermined composition produces similar results on these different zones both from a mechanical as from a cristallographic standpoint and as concerns the cold hammering properties.

Example

Supposing the weld is to be performed between natural untreated railway and tramway rails having a normal hardness up to 90/100 kgs. per sq. mm. corresponding to a Brinell hardness number of about 265/293 obtained with a 10 mm. ball under 3,000 kgs. pressure and containing:

Carbon about 0,2 to 0,6%
Manganese about 0,6% or more these rails may be welded by either of two aluminothermic methods, to wit with or without a steel plate disposed between the two ends to be welded.

(A) Intercalary method

The additional weld metal has the following composition

Carbon about 0,1 to 0,4%
Manganese up to about 1%
Silicon up to about 1%
Nickel about 1 to 3%
Chromium up to about 0,8%
Copper up to about 1%
Molybdenum and tungsten up to about 0,5%

The heat treatment of the cooled welding zone affects simultaneously the molten part of the weld and the superheated coarse-grained part.

It comprises a heating beyond the point of transformation (reheating) effected at about 900/1000° C., during about 30 minutes and there is obtained:

(a) A substantial increase in resistance and sag by up to about 10 times in the impact test,
(b) A substantial increase in tonnage (up to about 50%) and of the sag (up to about 100%) in the ultimate crushing resistance,
(c) An important increase in the resistance during the tractional stress effected normally to the plane of the joint;
(d) An important increase in the reduction of area and elongation during the tractional test effected perpendicularly to the plane of the joint.

(B) *Plate and pressing device method i. e. welding with an intermediate plate inserted between the upper parts of the parts to be welded which plate is not normally melted but only superheated*

The additional welding mass has the following composition:

Carbon about 0,1 to 0,4%
Manganese up to about 1%
Silicon up to about 1%
Nickel about 0,2 to 3%
Chromium up to about 0,8%
Copper up to about 1%
Molybdenum and tungsten up to about 0,5%

The heat treatment of the welding zone affects simultaneously the molten and the superheated coarse grained parts of the weld.

It comprises a heating beyond the transformation point (reheating) effected at about 900/1000° C. during about 30 minutes and there is obtained:

(a) A substantial increase in resistance and sag by up to about 10 times in the impact test,
(b) A substantial increase in tonnage (up to about 50%) and of the sag (up to about 100%) in the ultimate crushing resistance,
(c) An important increase in the reduction of area and elongation during the tractional test effected perpendicularly to the plane of the joint.

Another method consists in taking into account the complexity of the welding region and to apply two heatings above the transformation point (reheatings) of which the first performed at the higher temperature improves more especially the zones 1 and 2 and has a limited favorable action only on zone 3 whereas the second reheating is performed at a temperature substantially lower such that it cannot have any detrimental effect on the zones 1 and 2 and on the contrary improves the superheated zone and even the zones 1 and 2.

This treatment is especially applicable when the welded metal is very hard and has a composition very different from that of the additional weld metal.

Example

Supposing natural untreated very hard rails for tramways and railways are to be welded, these rails having a Brinell hardness number of 90 to 100 kgs. per sq. mm. corresponding to a Brinell hardness number of about 265/293 obtained with a 10 mm. ball under 3,000 kgs. pressure and containing Carbon about 0,6% or more
Manganese 0,6% or more These rails may be welded by either of two aluminothermic methods, to wit The intercalary method and the plate and pressing device method.

(A) Intercalary method

The additional weld metal will have the following composition:

Carbon about 0,2 to 0,6
Manganese up to about 1%
Silicon up to about 1%
Nickel about 2 to 5%
Chromium up to about 2,5%
Copper up to about 3%
Molybdenum and tungsten up to about 1%

The thermic treatment of the welding zone is directed first on the molten metal: it comprises two successive heatings (reheatings) both beyond the point of transformation. The first heating will be effected at a temperature at about 1000° C. or above during about 30 minutes; the second heating will be effected at about 850° C. to 950° C. during about 30 minutes and there is obtained:

(a) A substantial increase in resistance and sag by up to about 10 times in the impact test, (b) A substantial increase in tonnage (up to about 50%) and of the sag (up to about 100%) in the ultimate crushing resistance, (c) A substantial increase in the resistance during the tractional test effected perpendicularly to the plane of the joint;

(d) An important increase in the reduction of area and elongation during the tractional test effected perpendicularly to the plane of the joint.

(B) Plate and pressing device method

The additional weld metal will have the following composition:

Carbon about 0,1 to 0,4%
Manganese up to about 1%
Silicon up to about 1%
Nickel up to about 0,2 to 3%
Chromium up to about 2,5%
Copper up to about 3%
Molybdenum and tungsten up to about 1%

The heat treatment of the weld zone is directed first so as to affect the molten metal; it comprises two successive heatings (reheatings) both beyond the point of transformation: the first heating is effected at a temperature above about 1000° C. during about 30 minutes. The second heating is effected at about 850/950° C. during about 30 minutes and there is obtained:

(a) A substantial increase in resistance and sag by up to about 10 times in the impact test, (b) A substantial increase in tonnage (up to about 50%) and of the sag (up to about 100%) in the ultimate crushing resistance, (c) A substantial increase in the resistance during the tractional test effected perpendicularly to the plane of the joint, (d) An important increase in the reduction of area and elongation during the tractional test effected perpendicularly to the plane of the joint.

It should be noted that this method of the double heat treatment may also be used for ordinary or special railway rails, of whatever hardness, welded according to the intercalary method or through the plate and pressing apparatus method each time an exceptional resistance against shocks or against flexion in the case of comparatively distant ties is desired.

A third method is applicable to the welding of thermically treated rails. These rails have generally a grain made finer through water quenching. In this case the superheating of the ends has of course particularly noxious effects. It is therefore necessary for the weld zone to be submitted to a renewed quenching. The heat treatment will then consist in a heating above the transformation point followed by a cooling which is interrupted at a given temperature by quenching in water or in an emulsion of air and water, this quenching operation being followed if required by a tempering (or heating to a temperature under the point of transformation).

Example

Supposing railway or tramway rails are to be welded, which have been heat treated before use i. e. which have been quenched in water or in an emulsion of water and air with or without tempering, the Brinnell hardness number of which is above say 75 kgs. per sq. mm. corresponding to a Brinnell hardness number of about 220 obtained with a 10 mm. ball under 3000 kgs. pressure and containing:

Carbon about 0,2% or more
Manganese about 0,4% or more

These rails may be welded according to two aluminothermic methods such as the intercalary method and the plate and pressing device method.

(A) Intercalary method

The additional weld metal has the following composition:

Carbon about 0,1 to 0,4%
Manganese up to about 1%
Silicon up to about 1%
Nickel about 1 to 3%
Chromium up to about 0,8%
Copper up to about 1%
Molybdenum and tungsten up to about 0,5%

The heat treatment of the weld zone is caused to affect both the molten metal and the superheated metal. It comprises a heating beyond the point of transformation effected at over about 1000° C. during 30 minutes followed by a cooling in air and then quenching in water or an emulsion of air and water when the metal has reached about 800 to 900° C., this cooling being effected if required with a limited amount of water when immediate tempering is required through the remanent heat, which tempering is effected at a temperature under the transformation point. This quenching in water may also be complete and in this case it may be followed by a tempering through heating of the cold metal to a temperature under the transformation point.

The described treatment produces:

(a) An important increase in the resistance and sag (up to about 10 times) in the impact test, (b) A substantial increase in the tonnage and sag in the ultimate crushing resistance, (c) A substantial increase of the resistance, reduction of area and elongation during the tractional test effected perpendicularly to the plane of the joint.

(d) The above results are obtained together with a Brinell hardness number near that of the rails to be welded.

(B) Plate and pressing apparatus method

The additional weld metal will have the following composition:

Carbon about 0,1 to 0,4%
Manganese up to about 1%
Silicon up to about 1%
Nickel about 0,2 to 3%
Chromium up to about 0,8%
Copper up to about 1%
Molybdenum and tungsten up to about 0,5%

The heat treatment of the cooled weld zone is directed so as to affect both the molten metal and the superheated metal. It comprises a heating beyond the point of the transformation effected at over about 1000° C. during about 30 minutes, followed by a cooling in air and then quenching in water or an emulsion of water and air, when the metal has reached a temperature of about 800° C. to 900° C. This cooling may be effected with a limited volume of water when it is desired to provide an immediate tempering through the remanent heat, this reheating being effected at a temperature below the transformation point. This quenching in water may also be complete and in this case it may be followed by a tempering through the heating of the cold metal at a temperature under the point of transformation. The result found is:

(a) An important increase in the resistance and sag (up to about 10 times) in the impact test, (b) A substantial increase in the tonnage and sag in the ultimate crushing resistance, a substantial increase of the resistance, reduction of area and elongation in the tractional tests effected perpendicularly to the plane of the joint.

(c) The above results are obtained together with a Brinell hardness number near that of the rails to be welded.

By the term alloy steel as employed in the appended claims I mean a steel containing appreciable quantities of one or more of the alloying elements nickel, chromium, tungsten, molybdenum and copper within the limits recited above.

What I claim is:

1. The method of heat treating welded steel parts such as railroad and tramway rails produced by the alumino-thermic process and characterized by a zone of alloy steel weld metal, a zone of overheated base metal and an intermediate zone of the fusion product of the weld metal and the base which process consists in a heating to a temperature above 900° C. but below the melting point of the alloy steel, an air cooling down to between approximately 800° C. and 900° C. and a quenching at the same temperature whereby the weld is given mechanical resistance, cold hammering possibilities and resistance to wear as near as possible to those of the parts before the welding.

2. The method of heat treating welded steel parts such as railroad and tramway rails produced by the alumino-thermic process and characterized by a zone of alloy steel weld metal, a zone of overheated base metal and an intermediate zone of the fusion product of the weld metal and the base which process consists in heating to a temperature above 900° C. but below the melting point of the alloy steel, an air cooling down to a temperature above the transformation point of the alloy steel but below 900° C. and a quenching at the same temperature whereby the weld is given mechanical resistance, cold hammering possibilities, and resistance to wear approximating those of the parts before the welding.

3. The method of heat treating welded steel parts such as railroad and tramway rails produced by the alumino-thermic process and characterized by a zone of alloy steel weld metal, a zone of overheated base metal and an intermediate zone of the fusion product of the weld metal and the base which process consists in heating to a temperature above 900° C. but below the melting point of the alloy steel, an air cooling down to between 800° C. and 900° C., a quenching at the same temperature and in any case above the transformation point of the steel, and a reheating to a temperature underneath the point of transformation of the alloy steel, whereby the weld is given mechanical resistance, cold hammering possibilities and resistance to wear approximating those of the parts before the welding.

CLARENCE LEON DELACHAUX.